United States Patent [19]

Freundlinger et al.

[11] 4,296,177

[45] Oct. 20, 1981

[54] FLEXIBLE GRAPHITE SHEET, MATERIAL OR LAYER CONTAINING METAL MOLYBDATE

[75] Inventors: Ernst Freundlinger, Meitingen-Langenreichen; Alfred Hirschvogel, Langeweid, both of Fed. Rep. of Germany

[73] Assignee: Sigri Elektrographit GmbH, Meitingen bei Augsburg, Fed. Rep. of Germany

[21] Appl. No.: 106,167

[22] Filed: Dec. 21, 1979

[30] Foreign Application Priority Data

Jan. 20, 1979 [DE] Fed. Rep. of Germany ....... 2902252

[51] Int. Cl.$^3$ .............................................. B32B 9/00
[52] U.S. Cl. .................................... 428/408; 252/387; 423/445; 423/449; 423/460; 428/697; 210/687; 210/688
[58] Field of Search ............... 428/408, 539; 252/387; 423/445, 449, 460

[56] References Cited

FOREIGN PATENT DOCUMENTS 2748135  5/1979  Fed. Rep. of Germany ...... 428/408

*Primary Examiner*—Marion McCamish
*Attorney, Agent, or Firm*—Herbert L. Lerner; Laurence A. Greenberg

[57] ABSTRACT

Flexible graphite layer material containing at least one metal moylbdate with a solubility in water of $10^{-2}$ to $10^{-4}$ g/100 ml to inhibit corrosion. The corrosion inhibitor may be incorporated by first immersing the graphite layer material in a solution of an alkali metal molybdate, drying, and then immersing in a solution of very soluble metal salt in which the metal when combined with molybdate to form metal molybdate has the defined solubility. The graphite layer material is then dried and contains the desired molybdate corrosion inhibitor.

7 Claims, No Drawings

FLEXIBLE GRAPHITE SHEET, MATERIAL OR LAYER CONTAINING METAL MOLYBDATE

BACKGROUND OF THE INVENTION

1. Field of the Invention

The invention relates to a flexible graphite layer material which contains non-graphitic corrosion inhibitors.

2. Description of the Prior Art

The manufacture of flexible graphite layer material is known and according to German Pat. No. 66 804 this is accomplished by dipping flaky, natural graphite particles into a liquid oxidant and heating them subsequently to about 1000° C. within a few seconds. The individual graphite particles expand in this treatment by a considerable amount and can be densified without the addition of a special binder into flexible planar structures such as thin foils or thicker laminar shapes, as for instance, by rolling, pounding or hammering. The layer material, which is impervious to liquids and gases, and also temperature-resistant and self-lubricating, is used among other things as a seal or packing, where the layer material is in contact with other materials such as metals.

It has been found that some types of steel corrode in contact with graphite layer material. The intensity of the corrosion attack is determined by the type of surrounding medium and the type and amount of the impurities contained in the layer material. For instance, chrome-nickel steels corrode in contact with graphite layer material in fully demineralized water, but not in ordinary tap water. It is known to prevent harmful corrosion of certain types of steel in contact with graphite layer material or to reduce it considerably by working alkali metal salts of one or several elements of group VI A of the periodic system of the elements into the layer material. The effectiveness of these inhibitor additives, however, is limited in time, since the salts gradually go in solution or are washed out, especially if the graphite layer materials are used in high-pressure steam. For instance, in a packing, the corrosion inhibitor content of which was originally about 0.8% by weight, a migration of the inhibitors after extended exposure to steam of 50 bar, 300° C. was measured in accordance with the following Table:

|  | Inhibitor Content (sodium molybdate) |
|---|---|
| Inside | 0.09% by weight |
|  | 0.07 |
|  | 0.09 |
|  | 0.22 |
|  | 0.50 |
|  | 1.00 |
| Outside | 2.70 |

The steel in contact with the inside of the packing showed pitted corrosion damage after the test was terminated.

SUMMARY OF THE INVENTION

It is therefore an object of the invention to provide a graphite layer material and method of producing it, which layer material, in contact with a metallic material, does not cause corrosion even under extended stress with high-pressure steam.

With the foregoing and other objects in view, there is provided in accordance with the invention a flexible graphite layer material containing a metal molybdate with a solubility in water of $10^{-2}$ to $10^{-4}$ g/100 ml to inhibit corrosion.

In accordance with the invention, there is provided a method for the manufacture of a graphite layer material to incorporate a corrosion inhibitor which comprises immersing the graphite layer material in a first solution containing an alkali metal molybdate, subsequently drying the immersed layer material, immersing the dried material in a second solution containing a highly soluble salt of a metal to produce a molybdate of said metal from said soluble salt, said metal being selected that the metal molybdate has a solubility in water of $10^{-2}$ to $10^{-4}$ g/100 ml, and subsequently drying the graphite layer material leaving incorporated therein a metal molybdate of defined said solubility as a corrosion inhibitor.

Other features which are considered as characteristic for the invention are set forth in the appended claims.

Although the invention is illustrated and described herein as embodied in a flexible graphite sheet, material or layer, it is nevertheless not intended to be limited to the details shown, since various modifications may be made therein without departing from the spirit of the invention and within the scope and range of equivalents of the claims.

DETAILED DESCRIPTION OF THE INVENTION

In accordance with the invention, this corrosion problem is solved with a flexible graphite layer material which contains one or a plurality of molybdates, the solubility of which in water is $10^{-2}$ to $10^{-4}$ g/100 ml. The graphite layer material preferably contains one or more molybdates from the group silver, calcium, barium molybdate. A particularly favorable effect is obtained with a graphite layer material having a molybdate content of 0.5 to 1.0% by weight of the graphite layer material.

The invention is based on the insight that the solubility of the alkali metal salts of the VI A group(Cr, Mo, W) of the periodic system, used heretofore as corrosion inhibitors in graphite layer materials is excessive under certain conditions. Other salts such as strontium, zinc, cadmium or tin molybdate, exhibit too little solubility to still achieve an inhibiting effect. It has now been found that these disadvantages can be avoided with molybdate salts having a solubility in water between $10^{-2}$ and $10^{-4}$ g/100 ml. These salts exhibit a solubility which is sufficient to suppress corrosion but is not so large that they are dissolved from the graphite layer material completely during the normal operating life of, for instance, a packing.

To manufacture the graphite layer material according to the invention, the molybdates in powder form are mixed with expanded graphite particles and the mixture is pressed into foils or similar flexible shapes. According to another process, the molybdates are mixed with a graphite compound such as graphite hydrogen sulfate. This mixture is heated to form expanded graphite particles, and is formed subsequently into flexible planar structures. Preferred is a method, in which flexible graphite layer material is immersed in an aqueous solution of an alkali metal molybdate, for instance, sodium molybdate and is taken after interim drying into a second solution which contains one or more highly soluble salts from the group consisting of silver, calcium- and barium salts. Suitable salts for the second impregnating solution are, for example, silver nitrate, calcium hydroxide or barium hydroxide. The solutions desirably contain about 1% salts and the immersion time for each impregnating solution may be about 30 minutes for foil tapes 0.5 mm thick and with a raw density of about 0.7 g/cm$^3$. The distribution of the impregnating medium can be improved and the impregnating time reduced, if the impregnation is carried out at a pressure as low as possible and the pressure in the impregnating tank is subsequently increased.

The following example illustrates the present invention:

Graphite foil with a raw or bulk density of 0.7 g/cm$^3$ and a foil thickness of 0.5 mm was placed in the form of a roll in an impregnating tank and the tank was evacuated to a pressure of about $10^{-3}$ bar. After a degassing time of 15 minutes, the valve to the vacuum pump was shut. An aqueous solution containing 0.8% sodium molybdate was drawn into the tank and the pressure was then increased to about 10 bar. After a holding time of about 15 minutes, the foil was dried in a vacuum dryer at a temperature of about 110° C. and a pressure of about $10^{-2}$ bar for two hours and then replaced in the impregnating tank. The cycle began over again; and aqueous barium nitrate solution with about 1% salt was used as the second impregnating medium. At the end of the cycle, the dried foil contained about 1% barium molybdate.

To test the inhibition effect, discs were stamped from the graphite foil and each disc of graphite foil clamped between two chrome-nickel steel discs. The surface layers of the chrome-nickel steel discs had first been removed by grinding because of their possible passivating effect. This arrangement was hung in a vessel filled with completely demineralized water (conductivity less than 1 μs/cm). The water temperature was 100° C. and the evaporation losses were continuously made up by fresh water. After a testing time of 60 days, the steel plates in contact with the graphite layer material prepared as described in the preceding paragraph to contain 1% barium molybdate according to the invention showed to corrosion. Plates in contact with graphite layer material containing sodium molybdate as the inhibitor exhibited some pitted corrosion spots.

There are claimed:

1. Flexible graphite layer material containing a metal molybdate with a solubility in water of $10^{-2}$ to $10^{-4}$ g/100 ml to inhibit corrosion.

2. Flexible graphite layer material according to claim 1, wherein said material contains a plurality of said metal molybdates having said solubility.

3. Flexible graphite layer material containing a metal molybdate selected from the group consisting of silver-, calcium- and barium molybdate and mixtures thereof.

4. Flexible graphite layer material according to claim 1 or claim 2 or claim 3, wherein the molybdate content is 0.5 to 1.0% by weight.

5. Method for the manufacture of a graphite layer material to incorporate a corrosion inhibitor which comprises immersing the graphite layer material in a first solution containing an alkali metal molybdate, subsequently drying the immersed layer material, immersing the dried material in a second solution containing at least one highly soluble metal salt selected from the group of silver-, calcium- and barium soluble salts to produce a molybdate of said metal from said soluble salt, and subsequently drying the graphite layer material leaving incorporated therein a molybdate of a metal selected from the group consisting of silver, calcium and barium as a corrosion inhibitor.

6. Method for the manufacture of a graphite layer material to incorporate a corrosion inhibitor which comprises immersing the graphite layer material in a first solution containing an alkali metal molybdate, subsequently drying the immersed layer material, immersing the dried material in a second solution containing a highly soluble salt of a metal to produce a molybdate of said metal from said soluble salt, said metal being selected that the metal molybdate has a solubility in water of $10^{-2}$ to $10^{-4}$ g/100 ml, and subsequently drying the graphite layer material leaving incorporated therein a metal molybdate of said defined solubility as a corrosion inhibitor.

7. Method according to claim 5 or claim 6, wherein the molybdate content remaining in the graphite layer material as corrosion inhibitor is 0.5 to 1.0% by weight.

* * * * *